United States Patent [19]

Kawamura et al.

[11] Patent Number: 4,640,249

[45] Date of Patent: Feb. 3, 1987

[54] SYSTEM FOR CONTROLLING AN IGNITION TIMING IN AN INTERNAL COMBUSTION ENGINE AND METHOD THEREFOR

[75] Inventors: Yoshihisa Kawamura; Shuzo Fukuzumi, both of Yokosuka, Japan

[73] Assignee: Nissan Motor Company, Limited, Kanagawa, Japan

[21] Appl. No.: 749,413

[22] Filed: Jun. 27, 1985

[30] Foreign Application Priority Data

Jun. 30, 1984 [JP] Japan .................. 59-136708
Jun. 30, 1984 [JP] Japan .................. 59-136709

[51] Int. Cl.$^4$ ............................ F02P 5/15
[52] U.S. Cl. .................. 123/425; 123/417; 123/422; 123/423
[58] Field of Search ............ 123/425, 416, 417, 422, 123/423

[56] References Cited

U.S. PATENT DOCUMENTS

| | | | |
|---|---|---|---|
| 4,063,538 | 12/1977 | Powell et al. | 123/425 |
| 4,106,447 | 8/1978 | West | 123/117 |
| 4,211,194 | 7/1980 | Hattori et al. | 123/425 |
| 4,355,359 | 10/1982 | Kanegae et al. | 364/431.04 |
| 4,368,635 | 1/1983 | Yoshida | 73/35 |
| 4,370,964 | 2/1983 | Muranaka et al. | 123/425 |
| 4,373,489 | 2/1983 | Yamaguchi | 123/422 |
| 4,376,428 | 3/1983 | Hata et al. | 123/417 |
| 4,380,981 | 4/1983 | Enoshima et al. | 123/415 |
| 4,382,429 | 5/1983 | Enoshima et al. | 123/425 |
| 4,393,837 | 7/1983 | Sugihara et al. | 123/425 |
| 4,409,937 | 10/1983 | Asano | 123/425 |
| 4,420,967 | 12/1983 | Enoshima et al. | 73/35 |
| 4,423,621 | 1/1984 | Kenichi | 73/35 |
| 4,425,890 | 1/1984 | Yamaguchi | 123/418 |
| 4,452,204 | 6/1984 | Matsubara | 123/417 |
| 4,455,862 | 6/1984 | Takeuchi | 73/35 |
| 4,466,405 | 8/1984 | Hattori et al. | 123/425 |
| 4,508,079 | 4/1985 | Komurasaki et al. | 123/425 |
| 4,510,910 | 4/1985 | Ninomiya et al. | 123/417 |
| 4,527,526 | 7/1985 | Akasu | 123/425 |

FOREIGN PATENT DOCUMENTS

| | | |
|---|---|---|
| 53-56429 | 5/1978 | Japan . |
| 54-142425 | 11/1979 | Japan . |
| 56-554 | 1/1981 | Japan . |
| 57-212349 | 12/1982 | Japan . |
| 58-13749 | 3/1983 | Japan . |
| 58-82074 | 5/1983 | Japan . |
| 59-39974 | 3/1984 | Japan . |
| 59-39972 | 3/1984 | Japan . |
| 59-113267 | 6/1984 | Japan . |

Primary Examiner—Andrew M. Dolinar
Attorney, Agent, or Firm—Schwartz, Jeffery, Schwaab, Mack, Blumenthal & Evans

[57] ABSTRACT

A system and method for controlling an ignition timing in an internal combustion engine which controls the ignition timing by correcting the ignition timing by a retardation angle for avoiding the occurrence of the knocking when the level of knocking exceeds a predetermined angle and/or by correcting the ignition timing (MBT control) by a correction value on the basis of a crank angle at which the combustion chamber pressure has reached its maximum. When the engine is not in a transient operating state, the system stores the correction value of the ignition timing during knocking avoidance control or during MBT control as a learning value corresponding to the engine operating condition and calculates the actual ignition timing on the basis of the learning value and basic ignition timing determined by the engine operating condition. When the engine is in the transient operating state, the MBT control is not carried out. Therefore, such an undesirable state occurs that the correction value of the ignition timing is varied to a large degree when the engine operating state is changed, thus torque variation results, and inaccurate ignition timing control is not carried out. In addition, since the history of retardation angle correction by means of the past knocking avoidance control reflects the present calculation of ignition timing angle value, a preventive control of the occurrence of knocking is achieved. Consequently, a driving range in which the MBT control becomes effective is extended so that the engine output power can be improved.

10 Claims, 17 Drawing Figures

FIG.5 (C) $S_2$ $x + 60n$  $\alpha$
$(n = 0, 1, 2 ...)$

SYSTEM FOR CONTROLLING AN IGNITION TIMING IN AN INTERNAL COMBUSTION ENGINE AND METHOD THEREFOR

BACKGROUND OF THE INVENTION

The present invention relates to a system for controlling ignition timing in an internal combustion engine and a method therefor.

Conventional ignition timing control systems are exemplified by Japanese Patent Applications Unexamined Open No. Sho 54-142,425 (abbreviated as reference AA) published on Nov. 6, 1979, No. Sho 53-56,429 (abbreviated as reference AB) published on May 22, 1978, and No. Sho 58-82,074 (abbreviated as reference AC) published on May 17, 1983.

The reference AA discloses the same system, wherein the ignition timing is controlled so as to retard the ignition timing for avoiding the recurrence of knocking when a measured level (intensity) of knocking in the engine exceeds a predetermined threshold value.

The reference AB discloses the same system, wherein variation in pressure within a combustion chamber (referred to as cylinder pressure) of an engine cylinder is detected, and a corrective control of the ignition timing, i.e., so called Minimum Spark Advance for Best Torque is performed (hereinafter referred simply to as MBT control) in such a way that on the basis of a crackshaft rotational angle $\theta_{pmax}$ (hereinafter simply referred to as crank angle) at which the cylinder pressure has reached its maximum, the crank angle $\theta_{pmax}$ coincides with a predetermined target crank angle $\theta_M$ at which torque of the engine reaches its maximum.

The reference AC discloses the same system, wherein in addition to the MBT control, the ignition timing is so controlled as to retard the ignition timing for avoiding the recurrence of knocking taking a higher priority than the MBT control when the engine knocking is detected from a detection signal of strong fluctuations in combustion chamber pressure and a level (intensity) of detected knocking exceeds a predetermined value (until the level of knocking reduces and passes through the predetermined level).

The ignition timing control systems disclosed in the above-identified references have respective drawbacks described below.

In the conventional system disclosed in the reference AA, the control mode merely avoids recurrence of knocking whenever the knocking has occurred. In detail, since the corrective control of ignition timing is merely repeated for avoiding recurrence of knocking only after the knocking has actually occurred, such a control mode as to prevent the occurrence of knocking cannot be achieved before the knocking has occurred.

In the ignition timing control system disclosed in the reference AB, since the corrective control of the ignition timing is merely repeated in a proportional-integral (PI) control mode on the basis of a deviation between the crank angles $\theta_{pmax}$ and $\theta_M$, the correction value of the ignition timing is largely changed when the engine operating state is changed so that a variation of engine output torque is brought about. This results in a reduction of the engine driveability-characteristics.

In the conventional system disclosed in the reference AC, such as a control as to prevent occurrence of knocking cannot be achieved since the corrective control of ignition timing is repeatedly carried out only after the occurrence of knocking and the engine output power is accordingly reduced.

SUMMARY OF THE INVENTION

With the above-described drawbacks in the conventional systems in mind, it is an object of the present invention to provide a system and method for controlling an ignition timing in an internal combustion engine, wherein a history of a past retard angle correction value of the ignition timing, the controlling operation of which has been carried out for avoiding occurrence of knocking reflects the current calculation of an ignition timing angle value and wherein together with a history of the correction value of the ignition timing in the past MBT control reflecting the current calculation of the ignition timing angle value, the MBT control being not carried out when the engine is in a transient driving state in which the crank angle value $\theta_{pmax}$ becomes unstable and incredible.

This can be achieved by the present invention which comprises (a) first means for detecting an engine operating condition, (b) second means for determining whether the engine is in a transient operating state on the basis of the detected engine operating condition, (c) third means for detecting an engine rotational angle with respect to a top dead center of an engine cylinder at which pressure in a combustion chamber thereof has reached its maximum, (d) fourth means for storing a correction value of the ignition timing based on the detected rotational angle when a predetermined condition is satisfied and when the second means determines that the engine is not in the transient operating state as a learning value into an address thereof corresponding to the detected engine operating condition, and (e) fifth means for calculating the ignition timing on the basis of a basic ignition timing value determined according to the detected engine operating condition and the learning value corresponding to the detected engine operating condition.

BRIEF DESCRIPTION OF THE DRAWINGS

A more complete understanding of the present invention may be obtained from the foregoing description taken in conjunction with the attached drawings in which like reference numerals designate corresponding elements and in which.

DETAILED DESCRIPTION OF THE PREFERRED EMBODIMENT

Reference will hereinafter be made to the drawings in order to facilitate an understanding of the present invention.

Figure 1:
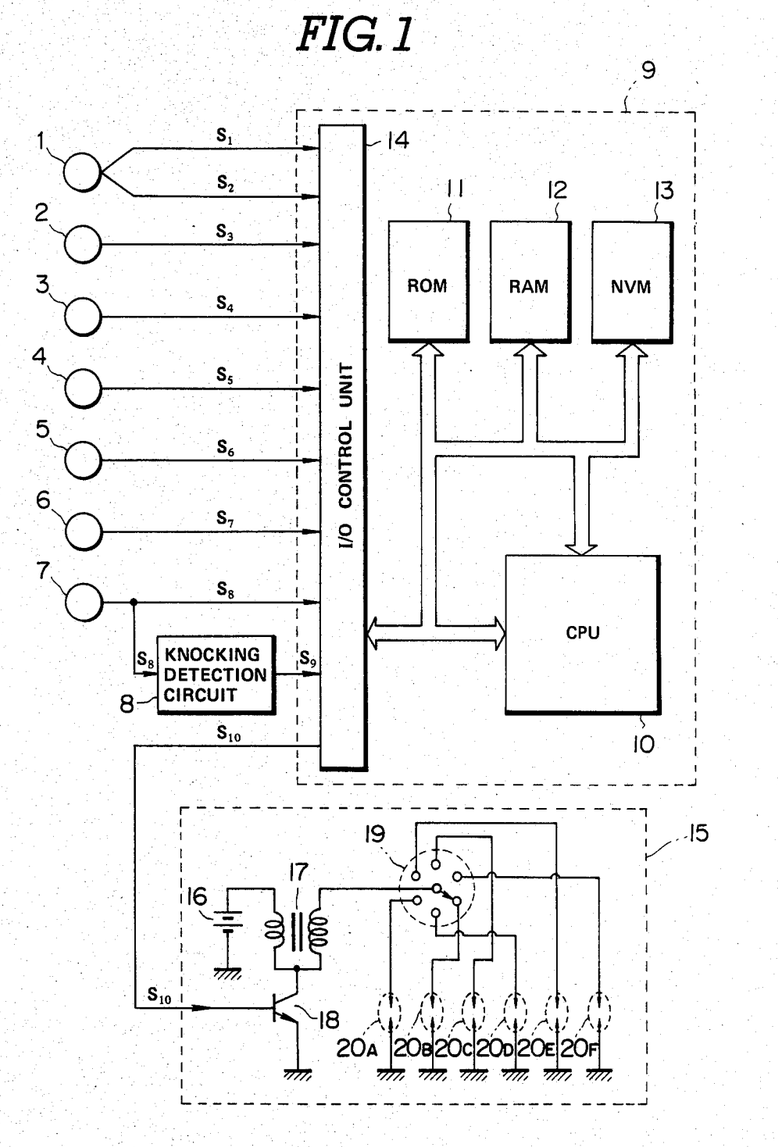
FIG. 1 shows a simplified circuit block diagram of a preferred embodiment according to the present invention.

FIG. 1 shows a structural circuit diagram of the system for controlling an ignition timing of an internal combustion engine according to the present invention.

In FIG. 1, numeral 1 denotes a crank angle sensor installed at a crankshaft of the engine which produces a reference position signal $S_1$ at a predetermined crank angle position (for example, 70° BTDC (Before Top Dead Center)) before each piston of the engine cylinders reaches top dead center in a compression stroke whenever the engine crankshaft rotates through 120° in the case of six-cylinder engine (180° in the case of four-cylinder engine) and produces a unit angle signal $S_2$ whenever the engine crankshaft rotates through the unit angle (for example, 2°). It should be noted that the unit angle $S_2$ is used to measure the engine revolution speed in the conventional way. The crank angle sensor is exemplified by U.S. Pat. No. 4,106,447 to West, issued on Aug. 15, 1978, the contents of which is hereby incorporated by reference.

Numeral 2 denotes an intake air quantity sensor installed within an engine intake manifold which detects and outputs an intake air quantity signal $S_3$ representative of an engine operating parameter in the conventional way.

Numeral 3 denotes an engine load sensor which detects the engine load from a throttle valve opening angle or from negative pressure in the intake manifold and outputs a load signal $S_4$ representative of the engine load as one parameter of the engine operating condition in the conventional way.

Numeral 4 denotes a cooling water temperature sensor which detects an engine cooling water temperature and outputs a signal $S_5$ representative thereof in the conventional way.

Numeral 5 denotes an acceleration sensor which detects a depression angle of an accelerator pedal representing an engine operating condition and outputs an acceleration signal $S_6$ representative thereof in the conventional way.

Numeral 6 denotes a cylinder identification sensor which outputs a cylinder identification signal $S_7$ at a predetermined crank angle position (for example, 80° BTDC, i.e., 80 degrees before the piston of a particular engine cylinder (for example, first cylinder) reaches the top dead center in its compression stroke).

Figure 2A:
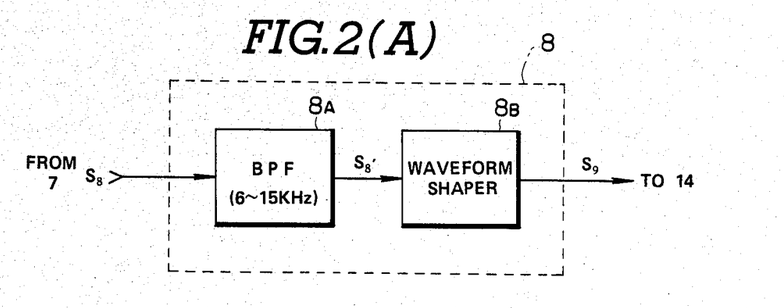
FIG. 2(A) shows an example of a knocking detection circuit shown in FIG. 1.
Figure 2B:
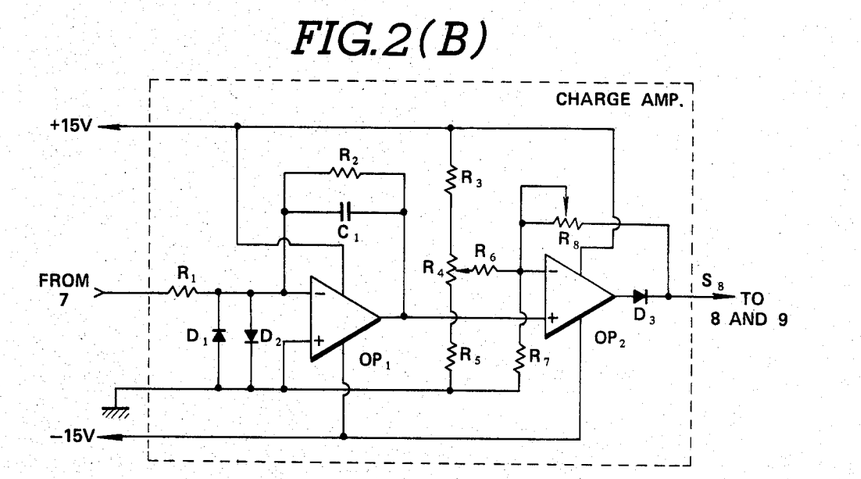
FIG. 2(B) shows an example of an electric charge amplifier.

Numeral 7 denotes a pressure-responsive sensor, comprising, for example, a piezoelectric element incorporated into a cylinder gasket between a cylinder head and cylinder block, which outputs a pressure-corresponding voltage signal $S_8$ via a charge amplifier exemplified in FIG. 2(B) in accordance with the vibration in combustion chamber pressure (cylinder pressure).

Numeral 8 denotes a knocking detection circuit. The internal circuit of the knocking detection circuit 8 is exemplified in FIG. 2(A). As shown in FIG. 2(A), the circuit 8 comprises a band-pass filter (BPF) 8A and waveform shaper 8B.

Figure 3A:
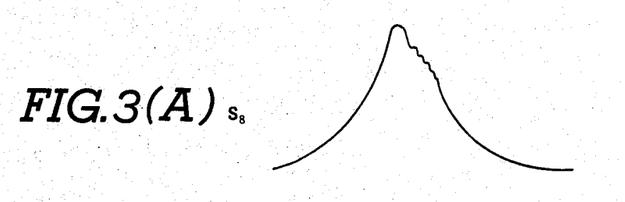
FIGS. 3(A), 3(B) and 3(C) show waveform charts for explaining an operation of the knocking detection circuit shown in FIG. 1.
Figure 3B:
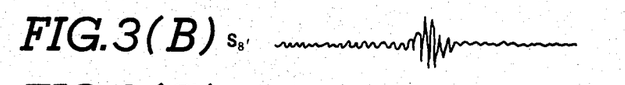

The band-pass filter 8A passes only a high frequency signal component $S_8'$ (refer to FIG. 3(B)) falling within a frequency band from, e.g., 6 to 15 kilohertz which is particularly included during occurrence of knocking in the pressure signal $S_8$ (refer to FIG. 3(A)) from the pressure sensor 7 via the charge amplifier.

Figure 3C:
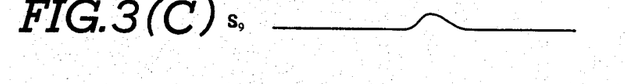

The waveform shaper 8B receives the high frequency signal component $S_8'$, half-wave rectifies it, forms (carries out an envelope detection) an envelope signal from the half-wave rectified signal, and outputs a knocking signal $S_9$ according to a level (intensity) of knocking as shown in FIG. 3(C). Alternatively, the knocking signal $S_8$ may be outputted in such a way that the pressure signal $S_8$ is smoothed to form a background level corresponding to a normal noise level of the engine and a difference in level between the formed background level and a maximum level of the above-described envelope signal is outputted as the knocking signal $S_9$.

Furthermore, in FIG. 1, numeral 9 denotes a control unit comprising a microcomputer having a Central Processing Unit (CPU) 10, Read-Only Memory (ROM) 11, Random Access Memory (RAM) 12, Non-Volatile Memory (NVM) 13, and I/O control circuit 14 incorporating an Input/Ouput Interface, various registers and counters, A/D converters, D/A converter, and high-frequency cutoff filter (low pass filter).

The CPU 10 receives various data on the basis of output signals from various sensors described above via the I/O control circuit 14 and processes these data by sequentially executing previously stored programs to be described later.

In addition, numeral 15 denotes an ignition circuit comprising, as shown in FIG. 1, for example, a power supply (battery) 16, an ignition coil 17, a power transistor 18, distributor 19, ignition plugs 20A through 20F each installed within the corresponding combustion chamber, the power transistor 18 which causes flow of a primary current of the ignition coil 17 and interrupts the primary current according to the receipt of the ignition signal $S_{10}$ from the control unit 9.

An operation of the embodiment which is described above will be described below in detail.

Figure 4:
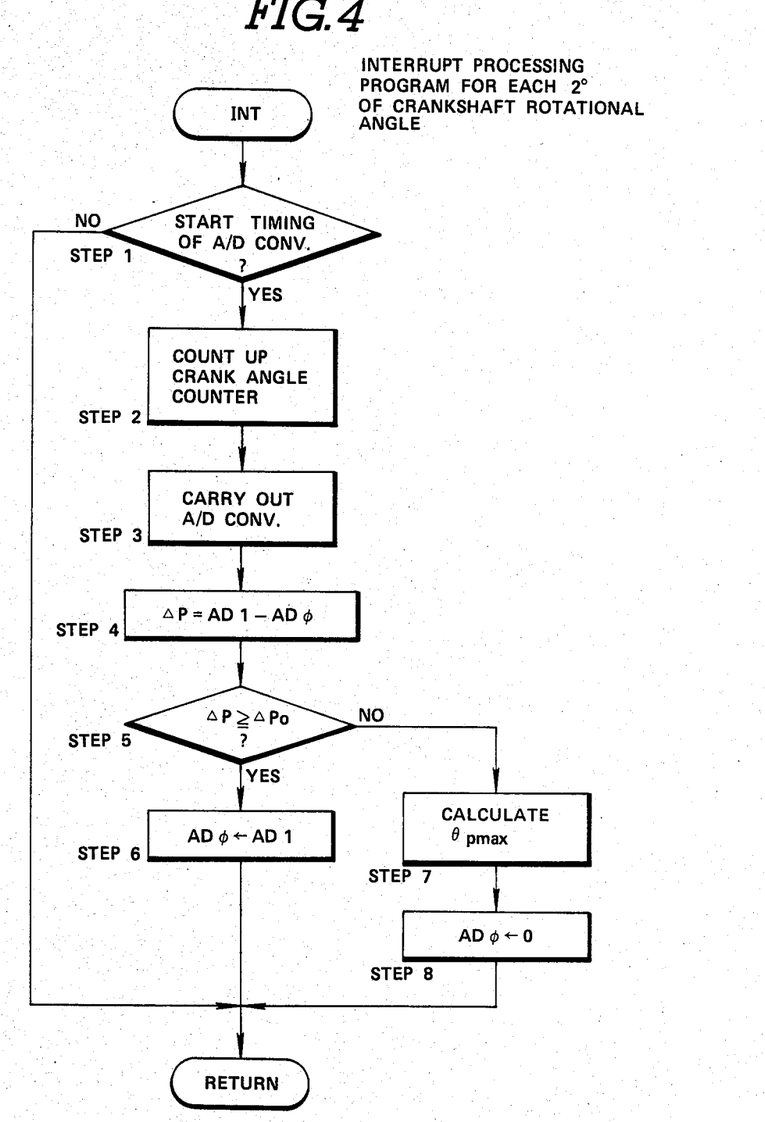
FIG. 4 shows an processing flowchart of an example of program for calculating the crank angle $\theta_{pmax}$ on which a CPU of a microcomputer shown in FIG. 1 executes.

First, FIG. 4 shows an interrupt processing routine for calculating the crank angle $\theta_{pmax}$ at which the combustion chamber pressure (cylinder pressure) has reached its maximum.

It should be noted that the processing flowchart shown in FIG. 4 is an interrupt processing program executed whenever the engine rotates through two degrees in synchronization with the unit angle signal $S_2$ derived from the crank angle sensor 1.

Figure 5:
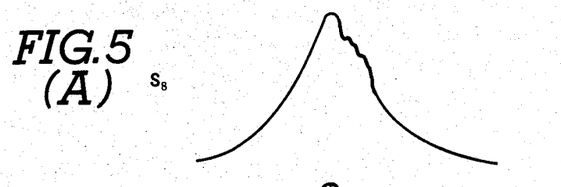
FIGS. 5(A), 5(B), and 5(C) show waveform charts for explaining the detection method of $\theta_{pmax}$.

In a first step, STEP 1, the CPU 10 determines whether the timing is proper to start an analog-to-digital conversion of a pseudo pressure signal $S_{80}$ shown in FIG. 5(B) obtained by cutting off the high frequency component of the pressure signal $S_8$ shown in FIG. 5(A) through the high-frequency cutoff (low-pass) filter (not shown) in the I/O control circuit 14. If the conversion start timing is not indicated in step STEP 1, the routine ends immediately and returns to a main routine (not shown). If the conversion start timing is indicated in STEP 1, the routine goes to STEP 2.

The determination processing executed in STEP 1 is carried out in the following way.

That is to say, a counter in the I/O control circuit 14 counts incrementally the unit angle signal (2° signal) $S_2$ from the crank angle sensor 1 and resets the count value whenever the cylinder identification signal $S_7$ is received from the cylinder identification sensor 6. The CPU 10 reads the count value from the counter whenever executing STEP 1. The CPU then turns a first flag on whenever the read count value coincides with x, x+60, x+120, x+180, x+240, and x+300 predetermined for detecting the crank angle $\theta_{pmax}$ for each interval 0 through 60, 60 through 120, 120 through 180, 180 through 240, 240 through 300, and 300 through 360 of the count value corresponding to the crank angle range of each engine cylinder.

The first flag is reset when a second flag is turned on which is turned on when the angle $\theta_{pmax}$ is calculated as described below. In addition, the routine goes to STEP 2 only when the first flag is turned on. It should be noted that the second flag is immediately reset after the second flag resets the first flag.

In STEP 2, the CPU 10 instructs a crank angle counter (software counter) to count incrementally by one (+1) (corresponding to the crank angle of 2°) for detecting the crank angle based on x+60n (n=0, 1, 2, 3, ...), as appreciated from FIG. 5(C).

In STEP 3, the CPU 10 issues a command to the A/D (analog-to-digital) converter of the I/O control circuit to convert the present pseudo pressure signal $S_{80}$ (refer to FIG. 5(B)) into the corresponding digital value so as to read the digitally converted value, e.g., after several ten microseconds.

In STEP 4, the CPU 10 calculates a difference $\Delta P$ ($\Delta P = AD1 - AD\phi$) between the currently stored digitally converted value $AD\phi$ (initally set to zero) and the digitally converted value $AD1$ produced in STEP 3.

In the subsequent step, STEP 5, the CPU 10 determines whether the calculated difference $\Delta P$ in the step STEP 4 equals or is larger than a reference value $\Delta P_o$ from which the CPU 10 can determine that the signal level of the pseudo pressure signal $S_{80}$ has reached its maximum. If $\Delta P \geq \Delta P_o$, the routine goes to STEP 6, wherein the currently digitally converted value $AD1$ is stored as a new digitally converted value $AD\phi$ ($AD\phi \leftarrow AD1$) and the routine returns to the main routine.

If $\Delta P < \Delta P_o$ in the step STEP 5, the CPU 10 determines that the signal level of the psuedo pressure signal $S_{80}$ has reached its maximum and, therefore, the routine goes to STEP 7, wherein the crank angle $\theta_{pmax}$ with respect to the top dead center when the combustion chamber pressure has reached its maximum is calculated from the present count value $\alpha$ of the above-described crank angle counter and x described above in the following equation:

$$\theta_{pmax} = 2(\alpha + x) - 80 \text{ (refer to FIG. 5(c))}$$

In addition, in STEP 7, the CPU 10 turns the second flag on and resets the count value in the crank angle counter.

Thereafter, the routine goes to STEP 8, wherein $AD\phi$ is cleared for the subsequent analog-to-digital conversion. The crank angle $\theta_{pmax}$ is derived when the combustion chamber pressure has reached its maximum sequentially in the above-described processing routine.

The processing for controlling the ignition timing will be described below with reference to the processing flowchart of FIG. 6.

Figure 6:
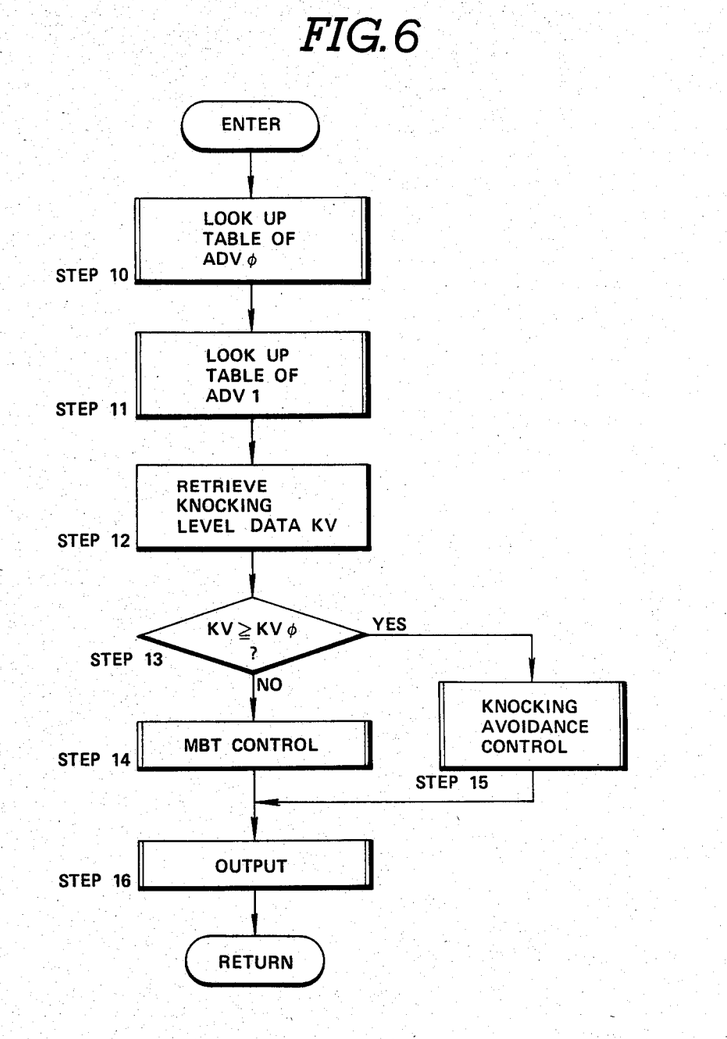
FIG. 6 shows an processing flowchart of an example of program for controlling the ignition timing on which a CPU shown in FIG. 1 executes.

It should be noted that the program shown in FIG. 6 is executed whenever the crank angle $\theta_{pmax}$ is calculated in the program shown in FIG. 4.

Figure 7:
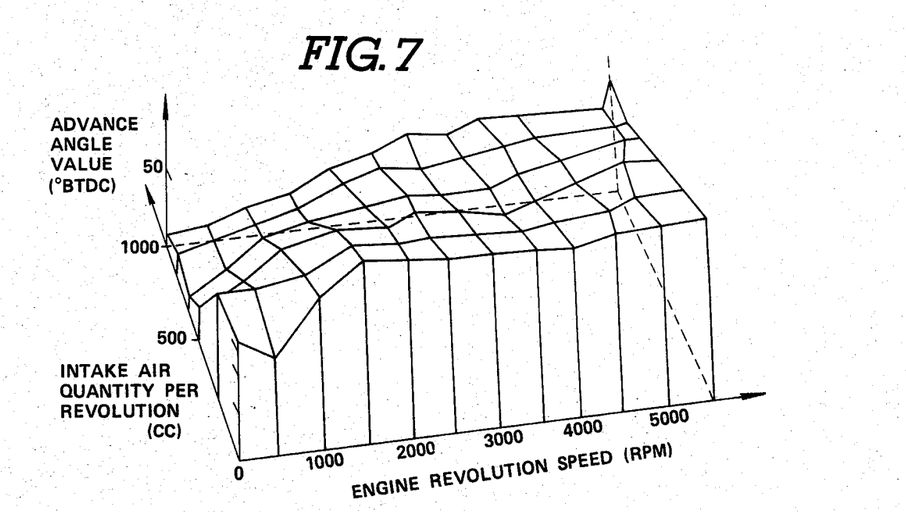
FIG. 7 shows a three-dimensional contour diagram of an ignition timing advance angle characteristic based on an engine speed and intake air quantity.

In a first step, STEP 10, the CPU 10 searches for a basic ignition timing advance angle value $ADV\phi$ shown in FIG. 7 in a table look up technique from the data on the current engine speed and intake air quantity detected as the signals $S_2$ and $S_3$. A three-dimensional table exemplified in FIG. 7 is previously stored in the ROM 11 shown in FIG. 1.

In addition, the basic table ($ADV\phi$) is provided as a function of the engine speed and engine load (in place of the intake quantity data, load data may be used which is based on the load signal $S_4$ of the load sensor 3 which detects an opening angle of the throttle valve or negative pressure within the engine intake manifold) and is set substantially to a condition for the MBF control in a low load range and to a value according to the level (intensity) of knocking.

The basic table shown in FIG. 7 is set, e.g., to a value matched with a center value of deviations between the individual engine models, due to aging effect and due to variations of environmental conditions (humidty variation, octance value variations of fuel, etc.) without consideration of these deviations which affect determination of the basic ignition timing. However, the MBT control to be described later cancels such variation factors.

The data on the engine revolution speed and intake air quantity used in STEP 10 are those sequentially obtained in the I/O control circuit 14. The engine revolution data is obtained by repeatedly counting the unit angle signal $S_2$ derived from the crank angle sensor 1 for a fixed interval of time and the intake air quantity data is obtained by converting the intake air quantity signal $S_3$ from the intake air quantity sensor 2 into the corresponding digital data.

In STEP 11, the CPU 10 searches for a learned value $ADV1$ (data with a sign of + or −) based on the correction value of the ignition timing from a learning table to be described later which is learned and stored in the NVM 13 shown in FIG. 1 through the execution of the ignition timing control routine in a table look up technique on the basis of the data on the engine speed and engine load (engine load data is obtained by the A/D conversion of the load signal $S_4$ from the load sensor 3).

In the next step, STEP 12, the CPU 10 fetches knocking level data $KV$ obtained through the A/D (analog-to-digital) converter of the I/O control circuit 14 which converts the knocking signal $S_9$ from the knocking detection circuit 8 shown in FIG. 1 into the corresponding digital value.

In the next step STEP 13, the CPU 10 compares the knocking level data $KV$ fetched in the step STEP 12 with a predetermined value $KV\phi$ (the value corresponds to an extremely low level of knocking and practically negligible level of knocking) in order to determine the presence or absence of knocking. If $KV < KV\phi$, i.e., no knocking has occurred, the routine goes to STEP 14, wherein the MBT control is carried out. If $KV \geq KV\phi$, i.e., a high level of knocking has occurred, the routine goes to STEP 15, wherein a knocking avoidance control is carried out with a higher priority than the MBT control.

The details of the MBT control carried out in the step STEP 14 will be described below with reference to FIGS. 8(A), 8(B) and 8(C).

As shown in FIG. 8(A), the CPU 10 determines whether the digitally converted data $T_w$ of the cooling water temperature sensor $S_5$ derived from the cooling water temperature sensor 4 shown in FIG. 1 through the A/D converter of the I/O control circuit 14 exceeds a predetermined value $T_{w\phi}$ in order to determine whether the engine has warmed up. If $T_w \geq T_{w\phi}$, the routine goes to STEP 141. On the contrary, if $t_w < T_{w\phi}$, i.e., the engine has not yet warmed up sufficiently, the routine goes to STEP 149. In the consecutive steps, STEP 141 and STEP 142, the CPU 10 determines whether the engine is in a transient driving state. If the engine is being accelerated in STEP 141, the routine goes to STEP 150. If the engine is now being decelerated in STEP 142, the routine goes to step 155. On the other hand, if the engine is now neither being accelerated nor decelerated, i.e., not in the transient driving state but in a stable driving state, the routine goes to STEP 143. Such determinations as described above are carried out in such a way that the CPU 10 determines whether an angular displacement per unit of time of an accelerator pedal displacement data which has been obtained through the analog-to-digital converter (not shown) in the I/O control circuit 14 from the accelerator signal $S_6$ derived from the accelerator pedal sensor 5 exceeds a predetermined value.

Although such acceleration or deceleration information can be obtained from the intake air quantity signal $S_3$ or load signal $S_4$, it is desirable to use the accelerator pedal signal $S_6$ since the above-described information can be fetched most quickly.

In STEP 143, the CPU 10 determines whether the crank angle $\theta_{pmax}$ determined in the above-described STEP 7 in FIG. 4 falls within a predetermined target range of crank angle from $\theta M_1$ to $\theta M_2$ ($\theta M_1 < \theta M_2$), i.e., $\theta M_1 \leq \theta_{pmax} \leq \theta M_2$, the routine goes to a step STEP 151. If $\theta_{pmax} < \theta M_1$, the routine goes to a step STEP 144. If $\theta_{pmax} > \theta M_2$, the routine goes to a step STEP 146.

The crank angles $\theta M_1$ and $\theta M_2$ which limit the target crank angle range are set for increasing the stability of the MBT control. For example, these angle values correspond to those values which give a torque approximately 0.5% lower than a maximum torque and which are present at advanced and retarded angle sides respectively with respect to a crank angle $\theta M$ which gives the maximum torque ($\theta M_1$ is a value at the retarded angle side and $\theta M_2$ is a value at the advanced angle side). It should be noted that since the engine generation torque characteristic is variable according to the engine operating condition, it is preferable that these limited angle values $\theta M_1$ and $\theta M_2$ may also be variable according to the engine operating condition.

In STEP 144, the CPU 10 determines whether the condition $\theta_{pmax} < \theta M_1$ continues for a predetermined number of times (n or more) that the ignition is carried out. If the condition of $\theta_{pmax} < \theta M_1$ continues for n or more times in STEP 144 (Yes), the routine goes to STEP 145, wherein the MBT control is carried out.

The processing of STEP 145 is carried out in order to reduce an erroneous determination due to the instability of the crank angle $\theta_{pmax}$ since the crank angle $\theta_{pmax}$ obtained in the above-described STEP 7 shown in FIG. 4 becomes unstable due to various factors. If the condition of $\theta_{pmax} < \theta M_1$ does not continue for n or more times, the routine goes directly to STEP 148.

In STEP 145, the CPU 10 carries out an advance angle correction processing in which a value of the previous feedback amount FB (FB denotes a value as the correction value of the ignition timing based on $\theta_{pmax}$, its initial value is zero) to which a crank angle value of 1° is added is the current feedback amount (FB←FB+1).

In detail, in STEP 145, the CPU 10 increments (advances) the feedback amount FB by 1° whenever the MBT control routine is called and only if the condition $T_w \geq T_{w\phi}$ is satisfied, the engine is in the stable operating state, and the condition $\theta_{pmax} < \theta M_1$ continues for n times.

In STEP 146, the CPU 10 determines whether the condition $\theta_{pmax} > \theta M_2$ continues for a predetermined number of times (m or more) that the ignition of the corresponding cylinder is carried out.

If the condition as $\theta_{pmax} > \theta M_2$ continues for m or more times, the routine goes to STEP 147, wherein a retard angle corrective control in the ignition timing is carried out.

The processing in STEP 147 is carried out for the same reason as that in the step STEP 144. If the condition $\theta_{pmax} > \theta M_2$ does not continue for m or more times, the routine goes directly to STEP 148.

It should be noted that the relationship between n in STEP 144 and m in STEP 146 is n<m, since the torque reduction in the case of $\theta_{pmax} < \theta M_1$ is more remarkable than that in the case of $\theta_{pmax} > \theta M_2$.

In STEP 147, the CPU 10 carries out a process of retard angle corrective control where a value of the previous feedback amount FB from which a crank angle of 1° is subtracted is used as the value of the present feedback amount FB.

In detail, in STEP 147, the CPU 10 decrements (retards) the feedback amount FB by 1° whenever the MBT control routine is called only if the condition $T_w \geq T_{w\phi}$ is satisfied, the engine is in the stable operating state, and the condition $\theta_{pmax} > \theta M_2$ continues for m or more times.

In STEP 148, a final ignition timing is calculated depending on the previous step of the routine.

When the routine comes from either STEP 145 or STEP 147, the final ignition timing is calculated as $ADV = ADV\phi + ADV1 + FB$, wherein $ADV\phi$ is the basic ignition timing determined in the STEP 10 shown in FIG. 6, ADV1 is the learned value obtained in the STEP 11 shown in FIG. 6, and FB is the current feedback amount obtained in the STEP 145 or step 147. When the routine comes from either STEP 144 or STEP 146, the final ignition timing is calculated by $ADV = ADV\phi + ADV1 + FB$ wherein the feedback amount FB used is the previous value.

It should be noted that although cases occur where the routine arrives at STEP 148 from any one of STEP 149, STEP 150, and STEP 151, such cases will be described sequentially below.

First, if the CPU 10 determines that the inequality $T_w < T_{w\phi}$ is established in STEP 140, the routine goes to STEP 149, wherein processing is carried out to shift the ignition timing to be retarded in order to promote warming up to the engine itself and exhaust gas purification. Thereafter, the routine goes to 148 without passing through the steps STEP 141 through 147.

In detail, the CPU 10 searches for a retardation angle $\delta_1$ corresponding to the current engine operating condition from among the retardation angle data for promoting the engine warm up, e.g., previously stored in the ROM 11 in a table look up technique on the basis of the data on engine revolution speed and engine load and sets the searched retardation angle value $\delta_1$ with a minus sign as the feedback amount $FB(=-\delta_1)$. Thereafter, the routine goes directly to STEP 148. It should be noted that the feedback amount FB in this case does not mean a feedback control amount concerning the MBT control.

When the engine is being accelerated (transient driving) in STEP 141, the CPU 10 carries out necessary processing in STEP 150 to retard the ignition timing. Thereafter, the routine goes directly to STEP 148, without passing through the steps 142 through 147, in other words withholding (suspending) the corrective control of the ignition timing based on the angle value $\theta_{pmax}$.

In detail, the CPU 10 searches for a retardation angle $\delta_2$ corresponding to the current acceleration driving condition stored in the ROM 11 in the table look up technique from the rate of change with respect to time of the engine load data (a time differential value of the engine load data) and engine revolution speed data and sets the searched retard angle amount $\delta_2$ with a minus sign as the feedback amount $FB(=-\delta_2)$. Such a processing as described above is carried out for the following reason: since the angle value $\theta_{pmax}$ is extremely unstable during the acceleration driving, air in the intake manifold enters the combustion chamber faster than the detection response of the intake air quantity sensor 2, and the ignition timing at the time of low engine load condition is set more to the advance angle side than at a time of high engine load condition where, the engine is susceptible to knocking.

Thereafter, the routine goes directly to STEP 148.

Furthermore, when the CPU 10 determines that $\theta M_1 \leq \theta_{pmax} \theta M_2$ in the step STEP 143, i.e., the engine is not in the transient state and the crank angle $\theta_{pmax}$ is controlled in the range of the above-described target crank angle range, learning and storing of the feedback amount FB is carried out in the successive steps STEP 153 et seq.

However, since a response delay of the intake air quantity sensor 2 and torsional vibration of the crankshaft have an effect on the feedback amount FB immediately after transient driving has occurred, i.e., for several seconds ($T_1$ second) immediately after acceleration/deceleration is carried out, the CPU 10 determines whether the time $T_1$ has elapsed after the engine is accelerated or decelerated ($T_1$ may preferably be varied according to the engine operating condition or according to the engine cooling water temperature). If the time $T_1$ has not elapsed, the routine goes to STEP 148 without carrying out the learning and storing processing of the feedback amount FB.

In STEP 148, the CPU 10 calculates the final ignition timing ADV as follows: $ADV = ADV\phi + ADV1 + FB$ using $FB = -\delta_1$ or $FB + -\delta_2$ when the routine comes from STEP 149 or STEP 150, respectively.

It should be noted that the value of FB is reset to zero from either $-\delta_1$ or $-\delta_2$ in STEP 142 or STEP 143 immediately after the inequality $T_w < T_{w\phi}$ is changed to the inequality $T_w \geq T_{w\phi}$ or immediately after acceleration driving changes to normal driving.

Next, in STEP 152, the CPU 10 determines whether the feedback amount FB is zero. If $FB = 0$, the routine goes to STEP 155 since no rewriting of ADV1 is needed. If $FB \neq 0$, the routine goes to STEP 153.

In STEP 153, since the CPU 10 determines that the engine warm up is sufficient, the engine is not in the transient operating condition, the angle value $\theta_{pmax}$ is in the target crank angle range and the feedback amount FB is not zero ($FB \neq 0$) with the present time $T_1$ having been elapsed after the transient engine operation has been carried out, the CPU 10 carries out a rewriting processing of ADV1 in which the feedback amount FB is stored in the NVM31 as a new learning value ADV1 at a lattice point of the learning table of the ADV1 in order to update the learning table.

It should be noted that if the actual engine revolution data and engine load data do not coincide with two data defining any lattice point of the learning table, the weighing (interpolation) processing is carried out with consideration of the deviations from the table data and thereafter the values thus obtained are updated into an approximate lattice point.

In addition, since the feedback amount FB updated in STEP 153 always undergoes the processing of either STEP 145 or STEP 147, the feedback value FB can be deemed to be the correction value of the ignition timing based on the crank angle $\theta_{pmax}$.

In STEP 154, the feedback amount FB used for the rewriting processing in STEP 154 is cleared to zero.

In STEP 155, the final ignition timing $ADV(=ADV\phi + ADV1)$ is calculated when the routine advances from STEP 154 to STEP 143 using the value $ADV\phi$ obtained in STEP 10 in FIG. 6 and the new value of ADV1 rewritten in STEP 153.

It should also be noted that if the engine is being decelerated in STEP 142 or if the CPU 10 determines that $FB = 0$ in STEP 152, the routine advances directly to STEP 155. At this time, the value ADV1 used in these steps is ADV1 obtained in STEP 11 shown in FIG. 6.

As described above, the MBT control is carried out in STEP 14 shown in FIG. 6.

Figure 9:
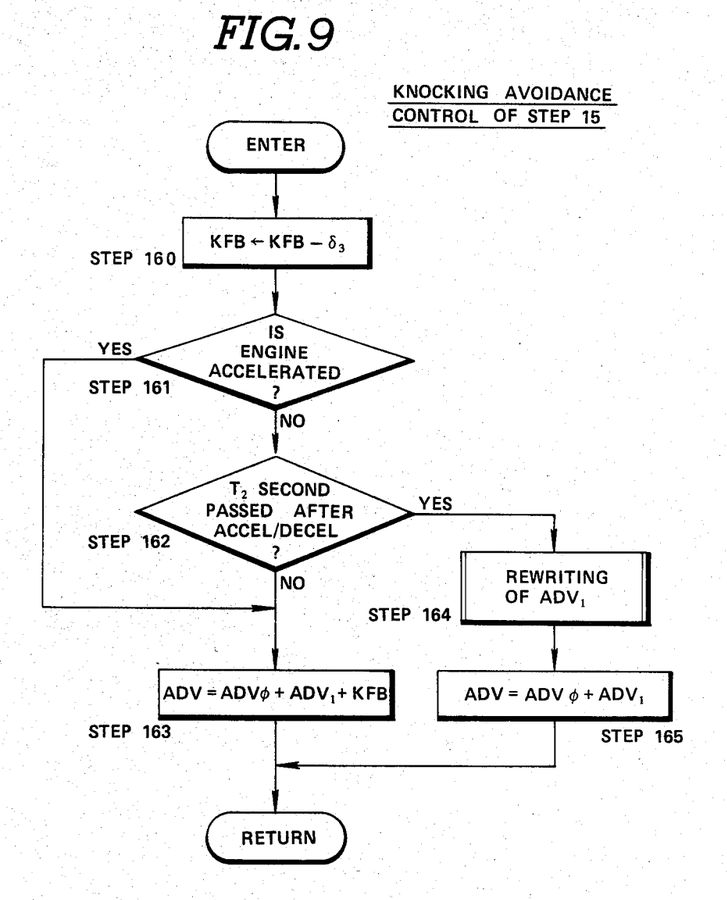
FIG. 9 shows a processing flowchart of details of a knocking avoiding control routine in a step STEP 15 shown in FIG. 6.

Next, as shown in FIG. 6, various processings are carried out on the knocking avoidance control shown in FIG. 9.

In a first step, STEP 160, a processing for recorrection of a retardation angle is carried out wherein a value of the previous feedback amount KFB (KFB denotes a value as the corrected retardation angle for avoiding knocking and an initial value thereof is zero) from which a predetermined value $\delta_3$ is subtracted to retard the ignition timing whenever the ignition is once carried out.

Figure 8:
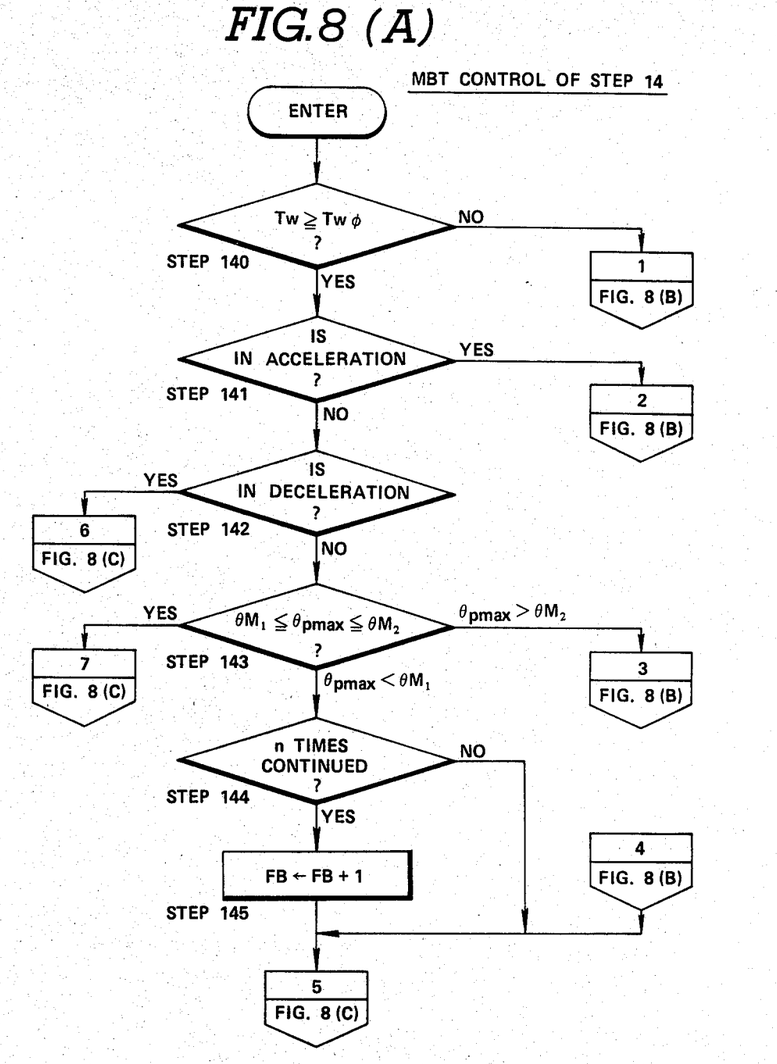
FIGS. 8(A), 8(B), and 8(C) show integrally a processing flowchart of details of an MBT control routine in step STEP 14 shown in FIG. 6.

In a second step, STEP 161, the same processing as STEP 141 shown in FIG. 8 is carried out, the routine goes to STEP 163 if the engine is being accelerated. If the engine is not being accelerated (is not in the transient operating condition), the routine goes to STEP 162.

In STEP 162, the CPU 10 determines whether the time $T_2$ has passed after acceleration of the engine ($T_2$ may preferably be variable according to the engine operating condition or cooling water temperature. $T_1 \geq T_2$). If the time $T_2$ has not passed after the engine acceleration, the routine goes to STEP 163. If the time $T_2$ has passed after the engine acceleration, the routine goes to a step STEP 164. In STEP 163, the final ignition timing ADV ($=ADV\phi + ADV1 + KFB$) is calculated for avoiding knocking on the basis of the feedback amount KFB obtained in STEP 10 and STEP 11 shown in FIG. 6.

Since the engine is in a stable operating state (i.e., not in the transient operating condition) when the time $T_2$ has elapsed after the engine has been accelerated, the CPU 10, in the step STEP 164, updates the learning table stored in the NVM 13 in such a way that a current feedback amount KFB (a correction value of the retardation angle of the ignition timing as the result of knocking avoidance control) is stored as the learned value ADV1 in a lattice point of the learning table of ADV1 which is determined by the current engine revolution data and engine load data.

The method of updating the learning table is the same as described above.

In STEP 165, the CPU 10 calculates the final ignition timing ADV (=ADV$\phi$+ADV1) during the data rewriting using a new value of ADV1 which has been rewritten in STEP 164 and the value of ADV$\phi$ obtained in STEP 10 in FIG. 6.

It should be noted that in the above-described knocking avoidance control routine, the processing in STEP 163 has been carried out when the engine is being decelerated or when the engine is in the stable operating condition after the engine is decelerated (The rewritting of ADV1 may be carried out in the engine stable operating condition after deceleration).

In this way, the knocking avoidance control is carried out in STEP 15 shown in FIG. 6.

With reference to FIG. 6, in STEP 16 which is to be executed after the execution of either the MBT control in STEP 14 and knocking avoidance control in STEP 16, the CPU 10 outputs the final ignition timing ADV determined in any one of STEP 148, STEP 155, STEP 163, and STEP 165 (refer to FIG. 8 or FIG. 9) from which a fixed crank angle value 70 (degrees) is subtracted (70−ADV) to a register of the input/output control circuit 14. Thereafter, the processing routine shown in FIG. 6 is once ended. Whenever such a processing as described above is carried out, the register of the input/output control circuit 14 registers a value of (70−ADV). At this time, the ignition signal $S_{10}$ is formed as described below and the power transistor 18 of the ignition circuit 15 then receives the ignition signal $S_{10}$.

Figure 10:
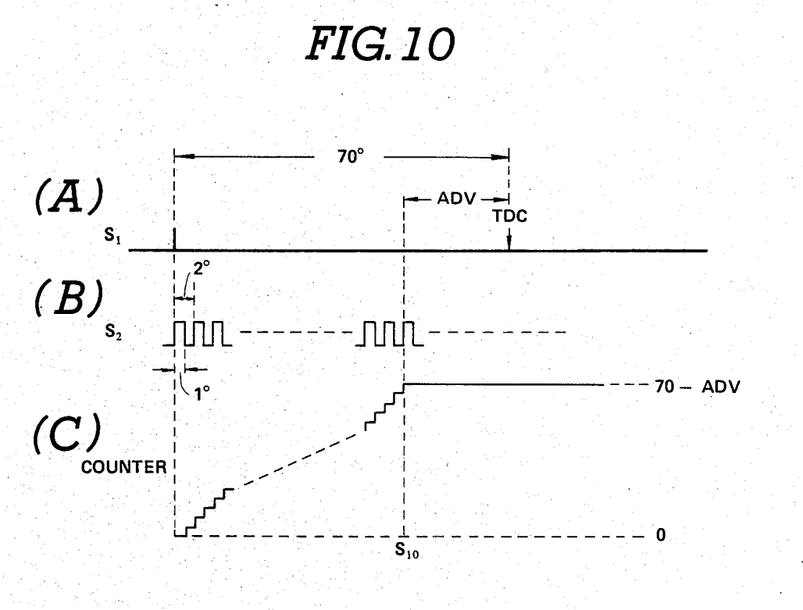
FIG. 10 shows a waveform chart for explaining formation of an ignition signal $S_{10}$ shown in FIG. 1.

FIG. 10 shows a timing relationship of each signal for explaining the formation of the ignition signal.

As shown in (A), (B), and (C) of FIG. 10, in the input/output control circuit 14 a counter counts incrementally the number of pulses in the unit angle signal $S_2$ at both rising and falling edges of each pulse of the unit angle signal $S_2$. Therefore, the counter is incremented by the crank angle of one degree since the pulsewidth of the unit angle signal $S_2$ corresponds to one degree of the crank angle as shown in (B) of FIG. 10. It should be noted that the counter is reset to zero whenever the reference position signal $S_1$ is received.

On the other hand, since the above-described register registers the value of (70−ADV) at the predetermined timing, the value of (70−ADV) is compared by means of a digital comparator (not shown) with the value of the counter and the ignition signal $S_{10}$ is sent to the power transistor 18 of the ignition circuit 15 when these values coincide with each other.

Since the reference position signal $S_1$ is generated 70 degrees before the top dead center of each engine cylinder, the value of the counter indicates (70−ADV) (equal to the value registered in the register) at a position, i.e., ADV BTDC.

When the ignition signal $S_{10}$ is outputted from the input/output control circuit 14 to the power transistor 18 (specifically a base of the power transistor 18), the power transistor 18 shown in FIG. 1 changes from, e.g., an on (conductive) state to an off (cutoff) state and then a high surge voltage generated at the secondary winding of the ignition coil 17 is sent via the distributor 19 to one of the spark plugs 20A through 20F according to a predetermined ignition order, thus the corresponding spark plug 20A through 20F being ignited.

Since the control unit 9 opeates as described above, the history of the past correction value of ignition timing through the MBT control and the past retardation angle correction value of the ignition timing always reflects the present calculation of ignition timing angle value. In addition, since the MBT control is halted when the engine is in the transient operating condition, no such an undesired condition will occur that the correction value of ignition timing is remarkably changed so that a torque variation results when the engine operating condition is changed and inaccurate control over the ignition timing is not carried out when the engine operating condition is in the transient state so that the engine driveability can remarkably be improved and the knocking can be prevented through the learning control mode. Consequently, an engine driving range in which the MBT control is effective can be extended and the engine output power can, thus, be increased.

Although in the above-described embodiment, the pressure sensor 7 is incorporated in the cylinder gasket, such a pressure sensor as comprising a piezoelectric element formed in a washer and incorporated in each spark plug as the washer thereof may alternatively be used.

In addition, although the above-described embodiment exemplifies the system for controlling ignition timing of the internal combustion engine which carries out both MBT control and knocking avoidance control, the corresponding effect described above can be achieved in the case of the system which carries out only MBT control. In this system, the knocking detection circuit 8 shown in FIG. 1 needs to be eliminated and STEP 12, STEP 13, and STEP 15 shown in FIG. 6 need to be omitted (including the corresponding steps 160 through 165 of FIG. 9).

In addition, the corresponding effect described above can be achieved in the case of the system which carries out only the knocking avoidance control.

In this system, STEP 13 and STEP 14 shown in FIG. 6 need to be omitted (including steps 140 through 148 in FIG. 7).

As described hereinabove, since in the system and method for controlling the ignition timing of the internal combustion engine according to the present invention, the history of the past correction value of the ignition timing by means of the previously executed MBT control reflects the present calculation of ignition timing and MBT control at the time of transient driving in which $\theta_{pmax}$ becomes unstable is not carried out, no such an undesired condition will occur that the correction value of the ignition timing is remarkably changed so that a torque variation results when the engine operating condition is changed and inaccurate control of ignition timing is not carried out when the engine operating condition is in the transient state so that the engine driveability characteristic can remarkably be improved.

In addition, since in the system and method therefor according to the present invention, the history of the past retardation angle correction value for the ignition timing control by means of the previously executed knocking avoidance control reflects the present calculation of the ignition timing value in addition to the above-described feature, a preventive control of knocking can be achieved and consequently the driving range in which the MBT control is effective is extended and the engine output power can be increased in addition to the above-described effect.

It will clearly be understood by those skilled in the art that the above-described description is made in terms of the preferred embodiment and various changes and modifications may be made without departing from the scope and spirit of the present invention which to be defiend by the appended claims.

What is claimed is:

1. A system for controlling an ignition timing of an internal combustion engine, comprising:
   (a) first means for detecting an engine operation condition;
   (b) second means for detecting whether the engine is in a transient operating state on the basis of the detected engine operating condition;
   (c) third means for detecting engine knocking;
   (d) fourth means for detecting an engine rotational angle with respect to a top dead center position in a compression stroke of an engine cylinder at which pressure in a combustion chamber has reached its maximum;
   (e) fifth means responsive to said first, second, third and fourth means for determining that engine knocking is not occurring, that the engine is warmed up, and that the detected rotational angle falls in a range from a first to a second reference value when a predetermined time has elapsed in which the engine has operated in a non-transient condition, and, responsive to said determination, storing a correction value of the ignition timing as a learning value in an address corresponding to the detected engine operating condition, said learning value being based on said detected rotational angle and said first and second reference values being values of engine rotational angle which are set for enhancing the stability of a minimum advance for best torque control and deviate from a predetermined maximum engine output torque value by a predetermined percentage toward retardation and advance angles, respectively, to stabilize the engine rotational angle at which the combustion chamber pressure is a maximum; and
   (f) sixth means for calculating the ignition timing on the basis of a basic ignition timing value determined according to the detected engine operating condition and the learning value corresponding to the detected engine operating condition.

2. The system according to claim 1, which further comprises seventh means for retarding the calculated ignition timing by a predetermined retardation angle according to the detected engine operating condition when said second means determines that the engine is in the transient operating condition.

3. The system according to claim 1, wherein said first and second reference values are varied according to the detected engine operating condition.

4. The system according to claim 1, wherein said fifth means calculates the ignition timing so as to advance the ignition timing by a predetermined angle value for each first predetermined number of times the engine ignition has carried out when the detected rotational angle is below the first reference value.

5. The system according to claim 1, wherein said fifth means calculates the ignition timing so as to retard the ignition timing by the predetermined angle value for each second predetermined number of times the engine ignition has been carried out when the detected rotational angle is above the second reference value.

6. The system according to claim 1, which further comprises:
   seventh means for storing another correction value of the ignition timing to avoid recurrence of knocking as a learning value into an address corresponding to the detected engine operation condition, said other correction value being stored at a time when engine knocking is occurring, and another predetermined time has elapsed since the engine has begun operating in a non-transient condition, said other correction value being determined to retard the ignition timing by a predetermined value for each occurrence of ignition.

7. The system according to claim 6, wherein said sixth means calculates the ignition timing on the basis of the learning value stored in said seventh means corresponding to the detected engine operating condition together with the basic ignition timing value.

8. A method for controlling an ignition timing of an internal combustion engine, comprising the steps of:
   (a) reading a basic ignition timing value according to an engine operation condition;
   (b) reading a learning value based on a corrective amount of the ignition timing according to the engine operating condition;
   (c) detecting whether an engine knocking has occurred;
   (d) detecting whether the engine is in a transient operating state;
   (e) determining whether the engine rotational angle with respect to a top dead center position of an engine cylinder at which combustion chamber pressure has reached a maximum is within a range which gives maximum engine output torque and, if said rotational angle is within said range, updating the corrective amount of the ignition timing value based on the engine rotational angle as the learning value if a first predetermined time has elapsed after the engine has not been in the transient operating state detected in said step (d) and when the engine knocking has not occurred as detected in said step (c);
   (f) updating the corrective amount of the ignition timing value for retarding the ignition timing so as to avoid recurrence of knocking as the learning value a second predetermined time after the engine has not been in the transient operating state detected in said step (d) and when the engine knocking has occurred as detected in said step (c); and
   (g) calculating the ignition timing on the basis of the basic ignition timing value read in said step (a) and the learning value corresponding to the engine operating condition.

9. The method according to claim 8 wherein step (e) includes changing the ignition timing to cause said engine rotational angle to be within said range if the engine rotational angle is outside of said range.

10. The method according to claim 9 wherein said learning value reflects the change required in the ignition timing to bring said engine rotational angle into said range.

* * * * *